United States Patent [19]

Yokogawa et al.

[11] Patent Number: 4,656,364

[45] Date of Patent: Apr. 7, 1987

[54] ANTENNA SWITCHING CIRCUIT FOR A DIVERSITY RECEIVING SYSTEM AND BRANCHING CIRCUIT WITH A SIGNAL ATTENUATION OPERATION

[75] Inventors: Tomohisa Yokogawa; Nobuo Kanda; Hideki Iwasaki, all of Kawagoe, Japan

[73] Assignee: Pioneer Electronic Corporation, Tokyo, Japan

[21] Appl. No.: 753,458

[22] Filed: Jul. 10, 1985

[30] Foreign Application Priority Data

Jul. 10, 1984 [JP] Japan ............................... 59-143064
Aug. 14, 1984 [JP] Japan ............................... 59-124280[U]

[51] Int. Cl.[4] ............................................. H02J 17/00

[52] U.S. Cl. .................................... 307/112; 307/146; 333/103

[58] Field of Search ................ 307/146, 112; 333/103; 340/825.03

[56] References Cited

U.S. PATENT DOCUMENTS

| | | | |
|---|---|---|---|
| 2,904,677 | 9/1959 | Heidester | 333/103 X |
| 3,492,501 | 1/1970 | Allen et al. | 333/103 X |
| 4,492,937 | 1/1985 | Theriault | 333/103 |
| 4,527,136 | 7/1985 | Kamiya | 333/103 |
| 4,542,300 | 9/1985 | Nagatomi | 307/146 X |

*Primary Examiner*—William M. Shoop, Jr.
*Assistant Examiner*—Sharon D. Logan
*Attorney, Agent, or Firm*—Banner, Birch, McKie & Beckett

[57] ABSTRACT

An antenna switching circuit which selectively transmits, to a receiver, RF signals from a plurality of antennas including RF signals of different frequency bands such as the VHF band and the MF band using a single output terminal. To prevent a level drop of RF signals of one of the frequency bands due to a common use of the output terminal, a unidirectional switching element is added to a switching circuit network by which the selection of RF signals from the different antennas is performed.

A branching circuit for separating RF signals of different frequency bands is provided with an attenuation operation using a variable impedance characteristic of a semiconductor switching element which is basically on-off operated for the switching between the RF signals of the different frequency bands.

3 Claims, 3 Drawing Figures

ANTENNA SWITCHING CIRCUIT FOR A DIVERSITY RECEIVING SYSTEM AND BRANCHING CIRCUIT WITH A SIGNAL ATTENUATION OPERATION

BACKGROUND OF THE INVENTION

1. Field of the Invention

The present invention relates to an antenna switching circuit for a diversity receiving system and a branching circuit with a signal attenuation operation being suitably provided within the antenna switching circuit.

2. Description of Background Information

A diversity receiving system is a type of radio reception in which two or more antennas are used for reducing adverse effects of the level change of an antenna output signal which might be experienced with a single antenna system.

In the field of diversity receiving, it is common to use an antenna switching circuit which receives RF signals from a plurality of antennas and transmits RF signals from one antenna to a receiver connected thereto. Among conventional antenna switching circuits, a drawback was that more than one output terminals were required for preventing a level drop if RF signals of different frequency bands such as the VHF band and the MF band are to be treated by an antenna switching circuit. Therefore, it has been desired to present an antenna switching circuit which can provide RF signals of different frequency bands through a single output terminal.

On the other hand, a branching circuit is generally used for separating RF signals of different frequency bands and deriving the RF signals separately, in such an occasion that a single antenna is commonly used for receiving the RF signals of the MF band (AM broadcasting band) and the VHF band (FM broadcasting band). Further, there is generally provided, on the receiver side, an AGC (Automatic Gain Control) circuit for attenuating the level of the input RF signal in an RF amplification stage, so as to avoid signal distortion when an RF signal of very high intensity is received. Under these circumstances, it is advantageous, if possible, to attenuate the level of RF signals in one of different freuquency bands within a branching circuit, in such a case the RF signals of different two frequency bands, such as the AM and FM broadcasting bands, are separated in a branching circuit and supplied to a receiver.

SUMMARY OF THE INVENTION

An object of the present invention is, therefore, to provide an antenna switching circuit in which a single output terminal is commonly used for RF signals of different frequency bands without causing a level drop of the RF signals.

Another object of the present invention is to provide a branching circuit for separating RF signals of different two frequency bands from each other, for attenuating the RF signals in one of two frequency bands.

According to a first aspect of the present invention, an antenna switching circuit comprises at least two antenna input terminals and an output terminal, a first series circuit having series connected first and second unidirectional switching elements arranged in a same direction, a connection point of the first and second unidirectional switching elements being ac-connected (connected so as to allow only ac signals) to one of the antenna input terminals, a second series circuit connected in parallel with the first series circuit and having series connected third and fourth unidirectional switching elements arranged in the same direction of the first and second unidirectional switching elements, a connection point of said third and fourth unidirectional switching elements being ac-connected to the other one of the antenna input terminals, a third series circuit connected in parallel with the first and second series circuits and having a first coil and a fifth unidirectional switching element connected in series with each other, a terminal of said third series circuit being ac-connected to said output terminal and an ac potential level of the other terminal of said third series circuit being made equal to a reference level, and a bias current supply means for supplying a bias current in a desired direction across said connection point of the first and second unidirectional switching elements and said connection point of third and fourth unidirectional switching elements, wherein said fifth unidirectional switching element of the third series circuit is arranged in a direction for permitting a flow of said bias current.

According to another aspect of the present invention, a branching circuit for separating RF signals of two different frequency bands, comprises an input terminal for the RF signals, a transformer having a primary winding and a secondary winding, a terminal of the primary winding is ac-connected to the input terminal, a semiconductor switch element connected between the other terminal of the primary winding and a point of a reference potential, a control voltage generating means for generating a control voltage whose level varies in response to an intensity of an RF signal among the RF sinals, a bias supply means connected to the control voltage generating means and the semiconductor switch element, for supplying to the semiconductor switch element a first bias current which is high enough to turn on the semiconductor switch element so that the RF signals are derived from said secondary winding when the RF signals of a higher one of the frequency bands are to be selected, and a second bias current which is smaller than the first bias current when the RF signals of a lower one of the frequency bands are to be selected so that an impedance of the semiconductor switch element is determined in response to the control voltage, and an inductor connected to the other terminal of the primary winding and having a high impedance against the RF signals of the higher one of the two frequency bands, wherein the RF signals of the lower one of the two frequency bands are derived through the inductor, and the RF signals of the higher one of two frequency bands are derived from the secondary winding of the transformer.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
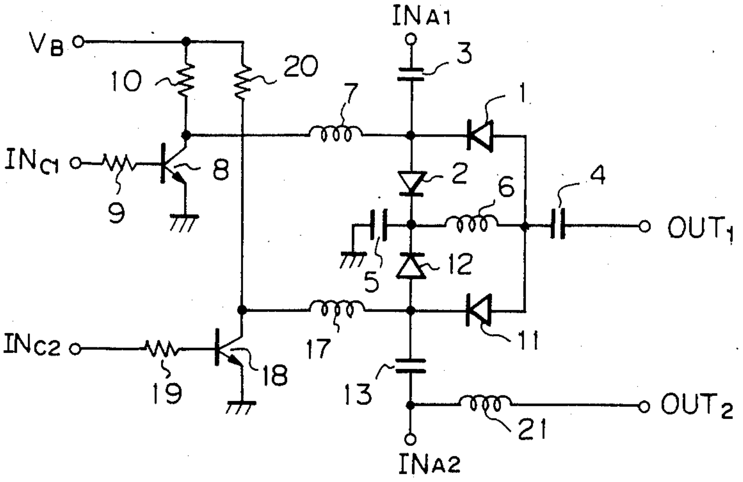
Fig. 1 PRIOR ART
FIG. 1 is a circuit diagram showing an example of conventional antenna switching circuit.

Before discussing the details of the antenna switching circuit and the branching circuit proposed herein and their advantages over the prior art, reference is directed to FIG. 1 in which an example of a conventional antenna switching circuit is illustrated.

In FIG. 1, the conventional antenna switching circuit is adapted to perform the diversity receiving of VHF band signals and constructed generally symmetrically. This antenna switching circuit is provided with a first antenna input terminal $IN_{A1}$ and a second antenna input terminal $IN_{A2}$ to which two independent antenna output signals are connected respectively. The first antenna input terminal $IN_{A1}$ is connected, through a capacitor 3, to a junction between a cathode of a first switching diode 1 and an anode of a second switching diode 2. The first and second switching diodes form a first series circuit of unidirectional switching elements. An anode of the first switching diode 1 is connected to a first output terminal $OUT_1$ through a capacitor 4. A cathode of the second switching diode 2 is grounded through a capacitor 5 and also connected to the anode of the first switching diode 1 through an RF (radio frequency) signal stopping coil 6. The junction between the cathode of the first switching diode 1 and the anode of the second switching diode 2 is connected to a collector of a transistor 8 through an RF signal stopping coil 7. A base of the transistor 8 is connected to a control input terminal $IN_{c1}$ through a resistor 9 and its emitter is grounded. A power voltage $V_B$ is supplied to the collector of the transistor 8 through a resistor 10. The other part of the symmetric construction which is connected to the second antenna input terminal $IN_{A2}$ is made up of third and fourth switching diodes 11 and 12, a capacitor 13, an RF signal stopping coil 17, transistor 18, and resistors 19 and 20. Since the mutual connections among these circuit elements are the same as in the above explained part of the symmetric construction, explanation thereof will not be repeated. The third and fourth switching diodes 11 and 12 together form a second series circuit of third and fourth unidirectional switching elements further, the anode of the switching diode 11 is connected to the junction between the anode of the first switching diode 1 and the capacitor 4. Similarly, the cathode of the switching diode 12 is connected to the junction point of the cathode of the switching diode 2. A terminal of the capacitor 13 is connected to the antenna input terminal $IN_{A2}$. A base of the transistor is connected to a second control input terminal $IN_{c2}$ via a resistor 19.

A second output terminal $OUT_2$ is provided and connected to the second antenna input terminal $IN_{A2}$ through a coil 21.

For the receiving operation, an antenna of VHF (very high frequency) band, for receiving FM broadcasting signals, is connected to the first antenna input terminal $IN_{A1}$ and an antenna covering both VHF band and MF (medium frequency) band, for receiving FM and AM broadcasting signals, is connected to the second antenna input terminal $IN_{A2}$. The first output terminal $OUT_1$ is connected to an RF input terminal of a receiver (not shown) for the FM broadcasting band and the second output terminal $OUT_2$ is connected to an RF input terminal for AM broadcasting signals of MF band. Thus only FM broadcasting signals are received by the diversity receiving system.

In operation, if the FM broadcasting signals of VHF band are to be received, the power voltage $V_B$ is supplied to the power supply terminal of the circuit. On the other hand, if the AM broadcasting signals of MF band are to be received, the supply of the power voltage $V_B$ is stopped. Further, during the receiving of the FM broadcasting signals, a high level control signal is applied to one of control input terminals $IN_{A1}$ and $IN_{A2}$ and a low level control signal is applied to the other one of control input terminals $IN_{A1}$ and $IN_{A2}$.

Assume that the high level control signal is applied to the control input terminal $IN_{c1}$ and the low level control signal is applied to the control input terminal $IN_{c2}$. The transistor 8 is turned on and the transistor 18 is turned off. Under this condition, due to the application of the power voltage $V_B$, a current flows through the resistor 10 and the transistor 8 to the ground. Also a current which serves as a bias current of the diodes 12 and 1 flows through a path consisting of the resistor 20, the coil 6, the diode 6, the coil 7, and the transistor 8, to the ground. In this way, the diodes 1 and 12 are switched on, while the diodes 2 and 11 are switched off.

Thus the RF input signals from the antenna input terminal $IN_{A1}$ are supplied to the output terminal $OUT_1$ through the capacitor 3, the diode 1, and the capacitor 4. On the other hand, the RF input signals from the antenna input terminal $IN_{A2}$ are grounded through the capacitor 13, the diode 12, and the capacitor 5. In this way, the RF signals from the antenna connected to the antenna input terminal $IN_{A1}$ are supplied to the receiver with the application of the high level control signal at the control input terminal $IN_{c1}$.

Conversely, when the low level control signal is applied to the control input terminal $IN_{c1}$ and the high level control signal is applied to the control input terminal $IN_{c2}$, the transistor 8 is turned off and the transistor 18 is turned on. Under this condition, a current flows through the resistor 20 and the transistor 18 due to the supply of the power voltage $V_B$. At the same time, a current which serves as a bias current of the diodes 2, 11 flows through a path consisting of the resistor 10, the coil 7, the diode 2, the coil 6, the diode 11, the coil 17, and the transistor 18, to the ground. Thus the diodes 2 and 11 are switched on, while the diodes 1 and 12 are switched off. In this state, the RF input signals from the antenna input terminal $IN_{A2}$ are supplied to the output terminal $OUT_1$ through the capacitor 13, the diode 11, and the capacitor 4. On the other hand, the RF input signals from the antenna input terminal $IN_{A1}$ are grounded through the capacitor 3, the diode 2, and the capacitor 5. Thus the RF signals from the antenna connected to the antenna input terminal $IN_{A2}$ are supplied to the receiver.

While receiving AM broadcasting signals where the supply of the power voltage $V_B$ is stopped, RF signals from the antenna input terminal $IN_{A2}$ are supplied to the output terminal $OUT_1$ through the coil 21. It is to be noted that the coil 21 transmits the RF signals of the MF band, such as the AM broadcasting band, well, while it exhibits a high resistance to the RF signals of the VHF band, such as the FM broadcasting band, and it transmits almost no RF signals of the VHF band. On the other hand, the capacitor 13 transmits the RF signals of VHF band well, while it exhibits a great resistance to the RF signals of the MF band, and it transmits almost no RF signals of the AM broadcasting band.

As mentioned before, in the case of the conventional antenna switching circuits such as the above explained example, it was rather inconvenient that two independent output terminals $OUT_1$ and $OUT_2$ respectively for the RF signals of VHF band and the RF signals of MF band were necessary. Moreover, two input terminals for the RF signals of the FM broadcasting band and the RF signals of the AM broadcasting band were also required on the receiver's side, corresponding to the output terminals of the antenna switching circuit.

For reducing the number of the output terminals, it is conceivable to directly connect the output terminals $OUT_1$ and $OUT_2$ with each other. However in that case, it will be difficult to prevent a level drop of the RF signals of the AM broadcasting band during the AM reception since the RF signals at the output terminal $OUT_2$ will be grounded through the output terminal $OUT_1$, the capacitor 4, the coil 6, and the capacitor 5. This is so because the coil 6 has a very low impedance against the RF signals of the AM broadcasting band.

The embodiment of the antenna switching circuit according to the present invention will be explained hereinafter with reference to FIG. 2 of the accompanying drawings.

Figure 2:
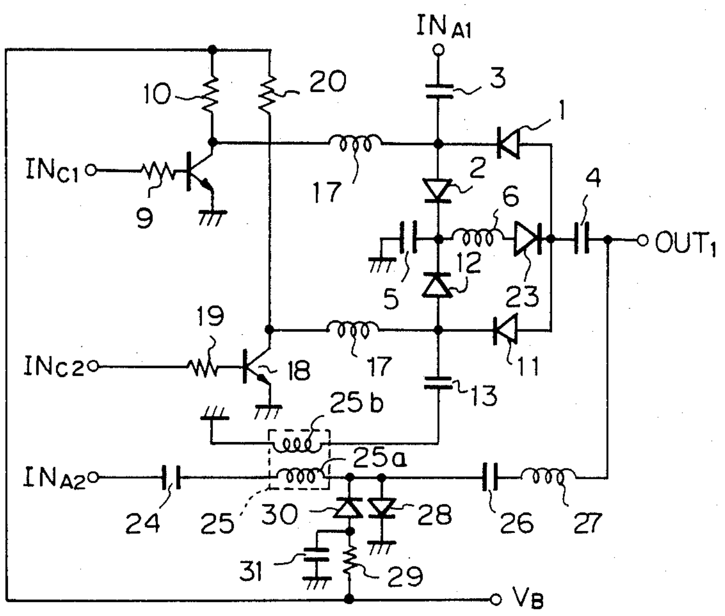
FIG. 2 is a circuit diagram showing an embodiment of the antenna switching circuit according to the present invention.

In FIG. 2, the antenna switching circuit of the present invention has basically the same construction as the antenna switching circuit of FIG. 1, and the explanation of the connection of the corresponding circuit elements will not be repeated here.

This antenna switching circuit is characterized by the following circuit elements in addition to the construcion of FIG. 1. Firstly, a diode 23 is provided, as a fifth unidirectional switching element, between the coil 6 and the common connection point of the anodes of the diodes 1 and 11. More specifically, a cathode of the diode 23 is connected to the anodes of the diodes 1 and 11 and the anode of the diode 23 is connected to a terminal of the coil 6. Instead of directly connecting the second antenna input terminal $IN_{A2}$ with a terminal of the capacitor 13, the second antenna input terminal $IN_{A2}$ is connected to a terminal of a primary winding 25*a* of a transformer 25 through a capacitor 24. The other terminal of the primary winding 25*a* is connected to the output terminal $OUT_1$ through a capacitor 6 and a coil 27, and at the same time grounded through a diode 28 which can be forward biased. Also the other terminal of the primary widing 25 is supplied with the power voltage $V_B$ through a resistor 29 and a diode 30 whose anode is connected to a power supply side. The anode of the diode 30 is grounded through a capacitor 31. A secondary winding 25*b* of the transformer 25 is grouned at a terminal thereof and the other terminal is connected to the capacitor 13 whose other terminal is connected in the same manner as the antenna switching circuit of FIG. 1.

The operation of the thus constructed antenna switching circuit according to the present invention will be explained hereinafter. During the receiving of the FM broadcasting signals, the power voltage $V_B$ is supplied and a current flows through the resistor 29, diode 30, and the diode 28 to the ground. Accordingly, the diodes 28, 30 are switched on and a voltage level of the terminal of the primary winding 25*a* to which the diodes 28, 30 are connected is set at the ground level. Under this condition, the input RF signals from the antenna input terminal $IN_{A1}$ are transmitted from the primary winding 25*a* to the secondary winding 25*b* and supplied to the capacitor 13. Therefore, under this condition, in the same manner as the conventional antenna switching circuits. RF signals from one of the antenna input terminals $IN_{A1}$ and $IN_{A2}$ are supplied to the output terminal $OUT_1$ in accordance with the state of the levels of the control input terminals $IN_{c1}$ and $IN_{c2}$. In addition, the diode 23 is switched on by the current flowing therethrough.

On the other hand, in the case of the receiving of the AM broadcasting signals, the diodes 28, 30 are switched off since the supply of the power voltage $V_B$ is stopped. Therefore, the RF signals from the antenna input terminal $IN_{A2}$ are supplied to the output terminal $OUT_1$ through the capacitor 24, the primary coil 25*a*, the capacitor 26, and the coil 27. Under this condition, the diodes 1, 11, 23 are switched off and the RF signals are prevented from flowing into the capacitor 4. Thus the level drop of the RF signals is prevented.

Further, the inductance of the coil 27 is selected such that it transmits the RF signals of MF band well, while it exhibits a great resistance to the RF signals of the VHF band. Therefore, the coil 27 transmits almost no RF signals of the FM broadcasting band and the flow of the RF signals from the output terminal $OUT_1$ to the coil 27 during the receiving of the FM broadcasting signals is prevented.

In the above explained embodiment, the RF signals of the AM broadcasting band and the RF signals of the FM broadcasting band are directed from the antenna input terminal $IN_{A2}$ to the output terminal $OUT_1$ by way of two independent paths respectively due to the operation of the circuit consisting of the transformer 25, the diodes 28 and 30, and the resistor 29. However, it is to be noted that the circuit can by simplified by eliminating the above mentioned circuit portion. In that case, the level drop of the RF signals of the MF band is also prevented by the circuit construction almost the same as the circuit shown in FIG. 1 while the output terminals $OUT_1$ and $OUT_2$ are directly connected with each other and the diode 23 is placed between the coil 6 and the capacitor 4.

Thus, with the antenna switching circuit according to the present invention, a bias current is supplied to the first and second series circuits each of which is made up of two unidirectional switch elements, such as diodes, so that RF signals of the FM broadcasting band obtained from two independent antenna input terminals are selectively supplied to an output terminal. Further, an additional series circuit made up of a coil and a unidirectional switch element, for blocking the flow of hte RF signals of the FM broadcasting band therethrough, is provided in parallel with the first and second series circuits. Therefore, when the RF signals of the AM broadcasting band are supplied to the output terminal when the RF signals of the FM broadcasting band are not selected, the grounding of the RF signals through the coil which might be experienced with the prior art is prevented since each of the unidirectional switching elements is switched off. Thus, the level drop of the RF signals of the AM broadcasting band is preveted.

In this way, the selective supply of the RF signals of two different bands such as the FM and AM broadcasting bands through a single output terminal has become possible. As a result, the connection of the antenna switching circuit to a receiver is enabled by a single output terminal and is much simpler than conventional circuits.

Figure 3:
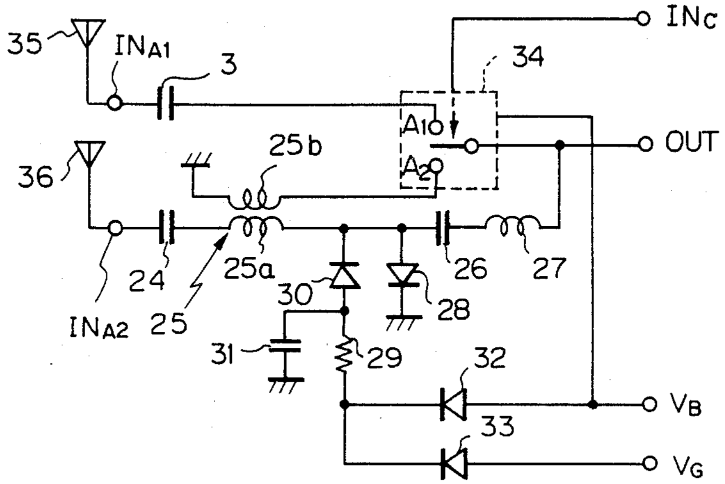
FIG. 3 is a circuit diagram showing an embodiment of the branching circuit according to the present invention, which is embodied in an antenna switching circuit.

Turning to FIG. 3, an embodiment of the branching circuit according to the present invention which takes the form of the antenna switching circuit will be explained hereinafter.

In FIG. 3, the circuit has two antenna input terminals $IN_{A1}$ and $IN_{A2}$ as in the previous embodiment. A capacitor 3 is connected between the antenna input terminal $IN_{A1}$ and a stationary contact $A_1$ of a switch 34. The switch 34 has another stationary contact $A_2$ and a movable contact which is connected to an output terminal OUT and the operation of the switch 34 is controlled by external control signals. The antenna input terminal $IN_{A2}$ is connected to the stationary contact $A_2$ of the switch 34 through a dc blocking capacitor 24 and a transformer 25 whose connection will be explained later. Thus the selection between the RF signals from the antenna input terminal $IN_{A1}$ and the RF signal from the antenna input terminal $IN_{A2}$ is performed by the switch 34. As mentioned above, the dc blocking capacitor 24 is connected to the transformer 25 at a terminal of a primary winding 25*a*. The other terminal of the primary winding 25*a* is connected to the output terminal OUT through a dc blocking capacitor 26 and a coil 27, and at the same time is connected to an anode of a diode 28 whose cathode is connected to the ground. Also, a cathode of a diode 30 is connected to this terminal of the primary winding 25*a*. An anode of the diode 30 is connected to a resistor 29 which, in turn, is connected to a cathode of a diode 32 whose anode is supplied with a power voltage $V_B$ during the receiving of the FM broadcasting signals. In addition, the anode of the diode 30 is grounded through a capacitor 31. Further, during the receiving of an AM broadcasting signal, an AGC voltage $V_G$ from a receiver connected to this switching circuit is supplied, through a diode 33 whose anode is arranged on the supply side of the AGC voltage, to the junction between the resistor 29 and the cathode of the diode 32. A terminal of the secondary winding 25*b* of the transformer 25 is connected to the stationary contact $A_2$ of the switch 34 and the other terminal of the secondary winding 25*b* is grounded. Selection of the stationary contacts $A_1$ or $A_2$ of the switch 34 is enabled only when the power voltage $V_B$ is supplied thereto and the position of the movable contact thereof is controlled by a level of a switching signal which is applied at a control terminal $IN_c$. In other words, the movable contact of the switch 34 is set at a neutral position when the power voltage $V_B$ is not supplied.

For operating this antenna switching circuit, an antenna 35 of the VHF band for receiving the FM broadcasting signals is connected to the antenna input terminal $IN_{A1}$, and an antenna 36 which covers the VHF band and the MF band for receiving the FM and AM broadcasting signals is connected to the antenna input terminal $IN_{A2}$. The output terminal OUT is connected to an RF input terminal of the receiver. Thus only FM broadcasting signals of the VHF band are received by the diversity receiving process.

The operation of the thus constructed antenna switching circuit will be explained hereinafter. The power voltage $V_B$ is supplied in the case of the receiving of the FM broadcasting signals. By the application of the power voltage $V_B$, a current having a magnitude above a predetermined level flows into the ground through the diode 32, the resistor 29, the diode 30, and the diode 28, as a bias current. Therefore, the diodes 28 and 30 are switched on and the voltage level of the terminal of the primary winding 25*a* of the transformer 25 at which the diodes 28, 30 are connected becomes almost equal to the ground level. Therefore, the RF signals from the antenna input terminal $IN_{A2}$ are transmitted from the primary winding 25*a* to the secondary winding 25*b* and the stationary contact $A_2$ of the switch 34.

At the same time, by the supply of the power voltage $V_B$, the switch 34 is activated and the movable contact is connected to one of the stationary contacts $A_1$ and $A_2$ according to the level of the switch control signal applied at the control terminal $IN_C$. When the stationary contact $A_1$ is selected, RF signals obtained at the antenna 35 and supplied at the antenna input terminal $IN_{A1}$ are transmitted to the output terminal OUT through the capacitor 3 and the switch 34. When, on the other hand, the stationary contact $A_2$ is selected, RF signals obtained at the antenna 36 and supplied at the antenna input terminal $IN_{A2}$ are transmitted to the output terminal OUT through the capacitor 24, the transformer 25, and the switch 34. In the case of the receiving of the FM broadcasting signals, the RF signals transmitted to the output terminal OUT from the switch 34 does not flow into the coil 27 since the coil 27 has a high impedance characteristic to the RF signals of the FM broadcasting band.

In the case of the receiving of the AM broadcasting signals, the supply of the power voltage $V_B$ is stopped so that the movable contact of the switch 34 is set at the neutral position. Under this condition, on the other hand, RF signals from the antenna 36 which are supplied from the antenna input terminal $IN_{A2}$ are transmitted to the output terminal OUT, through the capacitor 24, the primary winding 25*a*, the capacitor 26, and the coil 27.

In this state, the primary winding 25*a* of the transformer 25 serves simply as an inductance. However, the impedance thereof becomes almost negligible against the RF signals of the AM broadcasting band.

On the other hand, when the level of an RF signal received by the receiver becomes large, the AGC voltage $V_G$ which is obtained by rectifying an output signal of an intermediate frequency amplification stage of the receiver is supplied to the switching circuit. Therefore, a current whose magnitude corresponds to the level of AGC voltage $V_G$ flows into the ground through the diode 33, resistor 29, and the diodes 30 and 28. Since the magnitude of this current is smaller than the aforementioned predetermined level, the current does not cause the conduction of the diode 28 to a degree at which the voltage level at the terminal of the primary winding 25*a* becomes equal to the ground level. Therefore, the input RF signals are attenuated at a ratio determined by the impedance value of the diode 28 and the impedance value of the circuit portion viewed from the anode of the diode 28 towards the antenna 36. Since the impedance of the diode 28 becomes small as the magnitude of the current flowing therethrough increases, it becomes small as the level of the AGC voltage $V_G$ becomes large. Therefore, the degree of the attenuation of the RF signals becomes large as the level of the AGC voltage $V_G$ increases. In this way, the level of the RF signals of the AM broadcasting band supplied to the receiver is controlled according to the AGC voltage $V_G$.

In the above described example of the antenna switching circuit, the circuit is so constructed that two antennas are used for the receiving of the FM broadcasting signals. However, it is to be noted that the application of present invention is not limited to the above embodiment and the antenna switching circuit can be constructed to have more than two antenna input terminals for antennas of the VHF band, so that one, of the more than two antennas, is selected.

Thus in the case of the branching circuit according to the present invention which is embodied as an antenna switching circuit in the prefered embodiment, a terminal of a primary winding of a transformer having the primary winding and a secondary winding connected via an ac coupling to an input terminal of the RF signals and the other terminal of the primary winding connected to a switch element such as a diode which in turn is connected to a point of a reference potential. When RF signals of the higher one of the two different frequency bands such as the FM broadcasting band are to be selected, a bias current is supplied to the switch element so that a potential level of the other terminal of the primary winding is made equal to the reference potential, and the RF signals are derived through the secondary winding. When, on the other hand, RF signals of the lower one of the frequency bands such as the AM broadcasting band are to be selected, a bias current is supplied so that the impedance of the switch element is varied in response to a control voltage such as the AGC voltage, and the RF signals are derived after being attenuated by the impedance of the switching element. In, this way, the branching circuit according to the present invention is capable of functioning also as an attenuation circuit of the RF signals.

By employing the branching circuit according to the present invention, it becomes possible to expand the range of operation of the AGC circuit of a receiver, which in turn improves a high input characteristic of the receiver. Moreover, if the branching circuit of the present invention is used for an AM/FM receiver, it becomes possible to eliminate an attenuating circuit for AM signals on the receiver's side.

What is claimed is:

1. An antenna switching circuit comprising:

at least two antenna input terminals and an output terminal;

a first series circuit having series connected first and second unidirectional switching elements arranged in a same direction, a connection point of said first and second unidirectional switching elements being ac-connected to one of said at least two antenna input terminals;

a second series circuit connected in parallel with said first series circuit and having series connected third and fourth unidirectional switching elements arranged in said same direction, a connection point of said third and fourth unidirectional switching elements being ac-connected to the other one of said at least two antenna input terminals;

a third series circuit connected in parallel with said first and second series circuits and having a first coil and a fifth unidirectional switching element connected in series with each other, a terminal of said third series circuit being ac-connected to said output terminal and an ac potential level of said other terminal of said third series circuit being made equal to a reference level; and a bias current supply means for supplying a bias current in a desired direction across said connection point of said first and second unidirectional switching elements and said connection point of said third and fourth unidirectional switching elements, wherein said fifth unidirectional switching element of third series circuit is arranged in a direction for permitting a flow of said bias current.

2. An antenna switching circuit as set forth in claim 1, wherein said other one of said antenna input terminals is connected to said output terminal through a second coil.

3. A branching circuit for separating RF signals of two different frequency bands, comprising:

an input terminal for said RF signals;

a transformer having a primary winding and a secondary winding, a terminal of said primary winding being ac-connected to said input terminal;

a semiconductor switch element connected between said other terminal of said primary winding and a point of a reference potential;

a control voltage generating means for generating a control voltage whose level varies in response to an, intensity of an RF signal among said RF signals;

a bias supply means connected to said control voltage generating means and said semiconductor switch element, for supplying to said semiconductor switch element a first bias current which is high enough to turn on said semiconductor switch element so that the RF signals are derived from said secondary winding when said RF signals of a higher one of said frequency bands are to be selected, and a second bias current which is smaller than said first bias current when said RF signals of a lower one of said frequency bands are to be selected so that an impedance of said semiconductor switch element is determined in response to said control voltage; and an inductor connected to said other terminal of said primary winding and having a high impedance against said RF signals of said higher one of said two frequency bands, wherein said RF signals of said lower one of said two frequency bands are derived through said inductor, and said RF signals of said higher one of said two frequency bands are derived from said secondary winding of said transformer.

* * * * *